Figure 1:
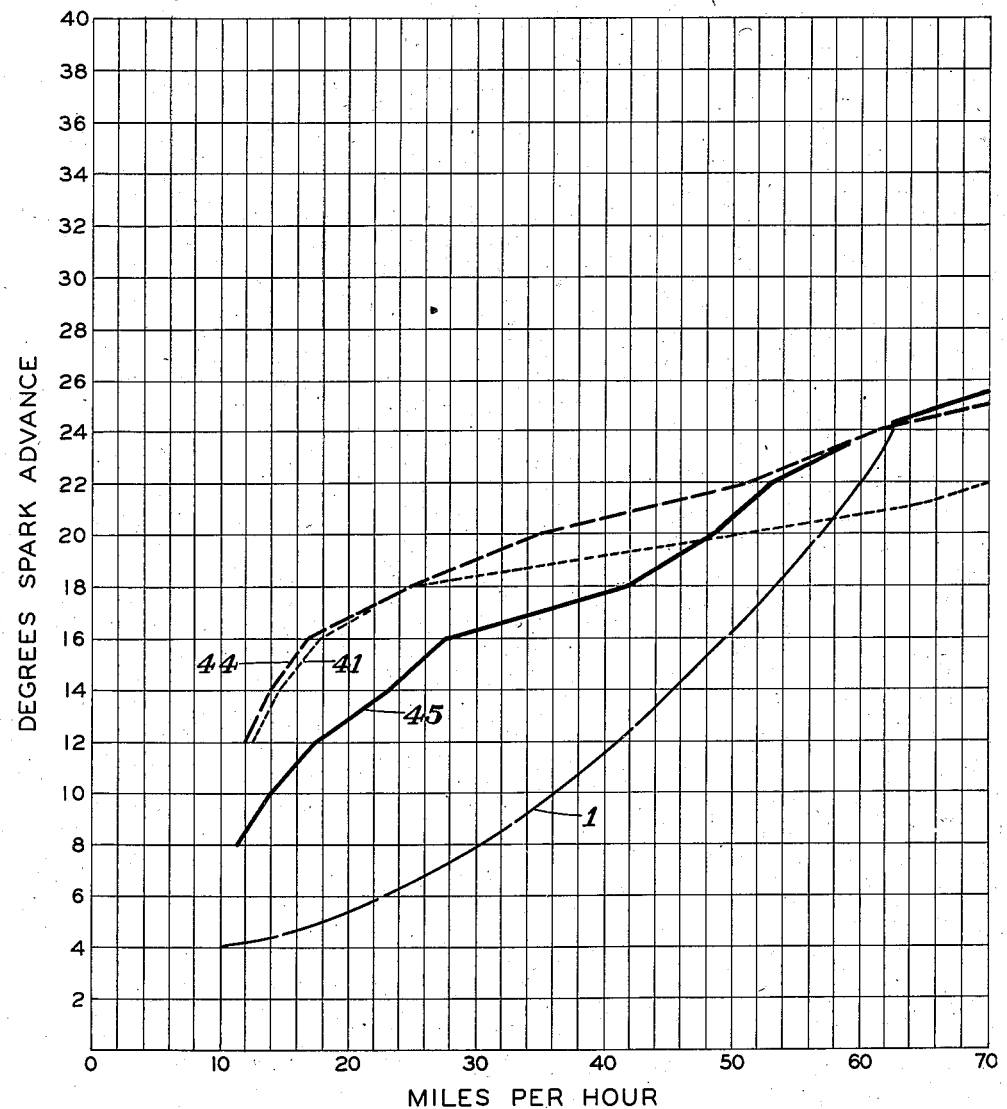

UNITED STATES PATENT OFFICE 2,360,584

MOTOR FUEL

Thomas H. Risk, Detroit, Mich., assignor to The Pure Oil Company, Chicago, Ill., a corporation of Ohio Application July 29, 1940, Serial No. 348,255

5 Claims. (Cl. 196—150)

This invention relates to motor fuels for internal combustion engines and particularly to automotive gasoline fuels having superior performance characteristics.

Among the qualities which characterize good gasoline, high anti-knock rating has probably become the most important. Many efforts have been made to improve the anti-knock value of motor fuels, and for this purpose many substances have been incorporated in gasoline. For example, metallo-organic compounds, benzol and various alcohols have been utilized. For some purposes it has been preferable to exclude metallo-organic compounds, and therefore, benzol and other hydrocarbons having desirable anti-knock properties have frequently been used. More recently, olefin polymers such as the polymers of olefins containing from two to five carbon atoms have been widely used in commercial motor fuels with great advantage. These materials can be prepared from the waste gases produced in the cracking of petroleum oil. The anti-knock properties of the olefin polymers may vary greatly depending upon the method of manufacture and the particular olefin used.

Studies of the problem of motor knock and of motor fuel compositions have revealed that the tendency of a motor fuel to cause engine knock is a function of the fuel composition as well as of engine conditions. It has been found that in general, anti-knock value of an homologous series of hydrocarbons depends upon the number of carbon atoms in the molecules and the compactness of the molecular structure, the anti-knock value increasing with numerical decrease and centralization of carbon atoms. The effect of tetraethyl lead on the anti-knock value of motor fuels has also been studied and a characterizing factor called the "lead susceptibility" has been introduced. By this factor, fuels may be evaluated in terms of the improvement in anti-knock value effected by a given addition of tetraethyl lead. It has been established that some gasolines show more improvement in anti-knock rating for a given addition of tetraethyl lead than do others. This variation in susceptibility has been found to be related to the composition of the fuel. For example, paraffinic and naphthenic hydrocarbons in general have been found to be much more susceptible to anti-knock improvement by the addition of tetraethyl lead than aromatic compounds.

It has been found that the unusual improvement in performance of internal combustion engines effected by motor fuels in accordance with this invention is not indicated by the usual anti-knock rating determination, due to deficiencies inherent in the available recognized methods of testing. Many methods and a rather large number of devices have been proposed for the evaluation of motor fuels by knocking tendencies. Probably the best-known testing devices are the Ricardo variable compression engine, the Ethyl Gasoline Series 30 engine, and the Cooperative Fuel Research engine, usually called C. F. R. The C. F. R. engine is undoubtedly in more general use today than any other engine for anti-knock testing purposes. The most widely used method of determining the knocking tendency with the C. F. R. engine is one which has been standardized and recommended by the American Society for Testing Materials. This is known as the A. S. T. M. Motor Method and is designated method D 357–34T. Results of tests by the A. S. T. M. Motor Method using the C. F. R. engine are reported in terms of octane numbers. Octane number of a motor fuel is numerically equivalent to the percent by volume of iso-octane (2,2,4trimethyl pentane) in a mixture of iso-octane and normal heptane, that is equal in knocking tendency to the fuel under test, the better fuels having the higher numerical values. Unless otherwise indicated, all octane numbers in this specification and in the appended claims, are A. S. T. M. octane numbers. In considering the effectiveness of various additives to motor fuels for improving octane number, it has been found convenient to refer to this effectiveness in terms of "blending octane number" or "octane blending value." This is particularly true of those fuels or those motor fuel components where the octance number is above 100.

However, from the inception of the method of testing motor fuels by measurement of knocking tendency, there has been and still is a considerable discrepancy between the rating of fuels as determined by the various testing methods. Furthermore, and of probably still greater importance, is the fact that there still prevails a probably greater discrepancy between the ratings of motor fuels as determined by any of the foregoing methods and the rating of motor fuels as determined by actual road performance tests. One prominent factor, if not the most prominent factor, that contributes to the latter discrepancy is the fact that the prevailing testing methods require the operation of the testing engines at constant speed and under constant load, whereas the knocking tendency of automotive engines in actual operation is greatest during periods of acceleration. Since the unusual characteristics of motor fuels in accordance with this invention are manifest under conditions of engine acceleration, it is apparent that the usual testing methods are of little value in evaluating such fuel. The only entirely satisfactory method known at the present time is a much more time-consuming and expensive test in stock automotive engines under conditions of actual road performance. This test is called the "Road rating test." The additional time and expense involved is believed to be justified by the fact that the results of such tests are final and conclusive as to the value of a motor fuel in actual service.

The road rating test consists of the evaluation of motor fuels by means of determining the knocking tendency of standard automobile engines when using the particular test fuel under conditions of actual acceleration performance on the road. Since it is generally accepted that knocking is an indication of inefficient operation, those fuels that show the least tendency to knock are the superior fuels. Through the use of proper instruments and replacing the standard automatic distributor with a manually controlled distributor, the highest spark advance obtainable under full throttle without evidence of knock at a given speed is determined. This test is repeated for a number of different speeds. By plotting the highest spark advance attainable without evidence of knocking against car speed in miles per hour, a curve is obtained which when compared with a curve showing the standard spark advance setting of the engine in which the tests are made, indicates whether or not a given fuel may be expected to knock in that particular car when operated with a standard spark advance setting. These determinations are all made in standard motor cars (with the exception of the distributor) under conditions of actual road operation.

It is an object of this invention to provide motor fuels having greatly improved performance characteristics.

It is another object of this invention to provide improved motor fuels having high road rating tests at all speeds.

It is still another object of this invention to provide improved motor fuels which exhibit superior high and low speed performance characteristics in internal combustion engines, particularly during periods of acceleration.

A further object is to provide improved motor fuels in which the chemical composition-boiling range characteristics are controlled within a definite fixed relation.

These and other objects of the invention will be apparent from the following detailed description considered in connection with the accompanying drawings, both figures of which are graphs.

As pointed out in application Serial No. 309,458 filed December 15, 1939, entitled "Improved motor fuel," vastly improved acceleration performance characteristics at low speed in internal combustion engines was secured by incorporating in motor fuel used in those engines, certain specific compounds having high volatility and high anti-knock value.

The preferred materials were olefin hydrocarbons boiling within the approximate range of 100° to 140° F. and and having an A. S. T. M. Motor Method octane blending value not substantially less than 110.

It has now been found that motor fuel containing substantial amounts of unsaturated hydrocarbons in the low boiling range and substantial amounts of saturated hydrocarbons in the high boiling range produce exceptionally good low and high speed performance in internal combustion engines and particularly those engines of high compression ratio such as compression ratios of 6 or 8 to 1. Those unsaturated hydrocarbons such as mono-olefins having a minimum tendency to form undesirable gums are preferred. It is intended that the aromatic hydrocarbons or benzene ring compounds be included within the term "unsaturated hydrocarbons." The term "saturated hydrocarbons" is meant to include those hydrocarbons which are classed as naphthenic. Compounds which are paraffinic in character are generally preferred. The boiling range or boiling point of the unsaturated hydrocarbons should be not substantially in excess of 240° F. and preferably not substantially in excess of 140° F. The minimum boiling point of such compounds which may be used is dependent upon the vapor pressure of the compound and of the fuel in which it is used. Excessive vapor pressure in the finished motor fuel must be avoided, since this leads to the difficulty in using the fuel, commonly known as "vapor locking." The high boiling fraction in which it is necessary that a substantial proportion of saturated hydrocarbons be present is that fraction above 200° F., and preferably above 240° F. The maximum boiling point of such compounds should be such that when the compounds are blended with the remaining components of the motor fuel the end point of the motor fuel blend will not be substantially in excess of that of ordinary motor fuels which at the present time is in the neighborhood of 400° F. for most commercial motor fuels. A particularly well-balanced motor fuel, capable of producing particularly good all speed performance may be obtained by maintaining at least approximately 25% of both the high boiling and low boiling fraction in the finished fuel. It will be noted that there is an over-lapping of the unsaturated and saturated materials in the boiling range of approximately 200° to 240° F. This is due to the fact that appreciable improvement in both high and low speed performance of motor fuel may be effected by either saturated or unsaturated compounds of suitable octane number which boil within this range, and which are incorporated in the motor fuel.

As a result of extensive tests in actual motor car operation, it has been found that the modern automobile engine performance under conditions of low speed acceleration is closely related to the composition of the low boiling portion of the motor fuel used in the engine, that is, the portion boiling not substantially above 240° or 140° F. Likewise, it has been found that the high speed performance of the engine is most closely related to the composition of the higher boiling portion of the motor fuel used in the engine, that is, the portion boiling above about 200° or 240° F.

In order to show the unusual results of motor performance on fuels prepared in accordance with this invention, special fuels were prepared in which the chemical composition in conjunction with the boiling range relationship was controlled within the desired limits and road rating test data on these fuels obtained. Table I shows the distillation characteristics and octane number, while Table II shows the chemical composition as related to boiling range of several of the motor fuels used in this work. The boiling range of these fuels was determined by A. S. T. M. distillation.

Table I

|  | Fuel 41 | Fuel 44 I. B. P.—240° F. | Fuel 44 240° F.—E. P. | Fuel 44 complete fuel |
|---|---|---|---|---|
| Gravity | 60.5 | 71.7 | 48.1 | 60.5 |
| I. B. P | 93 | 89 | 265 | 91 |
| 5% | 106 | 99 | 280 | 114 |
| 10% | 117 | 105 | 283 | 128 |
| 30% | 170 | 132 | 295 | 186 |
| 50% | 234 | 162 | 310 | 242 |
| 70% | 289 | 189 | 329 | 286 |
| 90% | 357 | 219 | 358 | 346 |
| 95% | 387 | 239 | 374 | 377 |
| E. P | 408 | 250 | 397 | 380 |
| Recovery | 97.2 | 96.1 | 98.4 | 95.8 |
| Residue | 0.9 | 0.6 | 1.1 | 1.2 |
| Loss | 1.9 | 3.3 | 0.5 | 3.0 |
| A. S. T. M. Octane number | 70.4 | | | 70.2 |

|  | Fuel 45 I. B. P.—240° F. | Fuel 45 240° F.—E. P. | Fuel 45 complete fuel |
|---|---|---|---|
| Gravity | 68.1 | 46.1 | 58.6 |
| I. B. P | 124 | 261 | 126 |
| 5% | 154 | 282 | 178 |
| 10% | 165 | 288 | 192 |
| 30% | 184 | 302 | 224 |
| 50% | 196 | 320 | 251 |
| 70% | 204 | 343 | 300 |
| 90% | 213 | 380 | 361 |
| 95% | 220 | 400 | 383 |
| E. P | 238 | 417 | 412 |
| Recovery | 98.2 | 98.3 | 98.8 |
| Residue | 1.0 | 1.3 | 1.1 |
| Loss | 0.8 | 0.4 | 0.1 |
| A. S. T. M. octane number | | | 70.0 |

|  | Fuel 4 I. B. P.—240° F. | Fuel 4 240° F.—E. P. | Fuel 4 complete fuel |
|---|---|---|---|
| Gravity | 72.7 | 43.7 | 63.9 |
| I. B. P | 91 | 252 | 93 |
| 5% | 108 | 268 | 114 |
| 10% | 116 | 276 | 126 |
| 30% | 142 | 293 | 166 |
| 50% | 171 | 314 | 205 |
| 70% | 197 | 337 | 241 |
| 90% | 211 | 362 | 333 |
| 95% | 219 | 379 | 360 |
| E. P | 230 | 399 | 372 |
| Recovery | 97.3 | 97.5 | 97.5 |
| Residue | 1.0 | 1.7 | 0.9 |
| Loss | 1.7 | 0.8 | 1.6 |
| A. S. T. M. octane number | | | 85.0 |

|  | Fuel 5B I. B. P.—240° F. | Fuel 5B 240° F.—E. P. | Fuel 5B complete fuel |
|---|---|---|---|
| Gravity | 74.4 | 43.3 | 61.7 |
| I. B. P | 95 | 264 | 104 |
| 5% | 109 | 276 | 131 |
| 10% | 117 | 281 | 143 |
| 30% | 142 | 298 | 182 |
| 50% | 177 | 314 | 216 |
| 70% | 200 | 334 | 254 |
| 90% | 213 | 361 | 341 |
| 95% | 219 | 374 | 364 |
| E. P | 227 | 392 | 378 |
| Recovery | 97.5 | 98.4 | 97.5 |
| Residue | 0.7 | 1.0 | 0.9 |
| Loss | 1.8 | 0.6 | 1.6 |
| A. S. T. M. octane number | | | 91.4 |

Table II

| Fuel | Olefins | Aromatics | Naphthenes | Paraffins | Total fuel |
|---|---|---|---|---|---|
|  | Per cent | Per cent | Per cent | Per cent | Per cent |
| 41 | 80.0 | | | | |
| 44 I. B. P.—240° F | 70.2 | 1.1 | 8.9 | 19.8 | 55 |
| 44 240° F.—E. P | 7.0 | 13.3 | 43.9 | 35.8 | 45 |
| 45 I. B. P.—240° F | 8.3 | 3.8 | 9.7 | 78.2 | 50 |
| 45 240° F.—E. P | 46.0 | 11.9 | 11.0 | 31.1 | 50 |
| 4 I. B. P.—240° F | 51.7 | 1.4 | 12.2 | 34.7 | 71 |
| 4 240° F.—E. P | 15.5 | 10.3 | 66.1 | 8.1 | 29 |
| 5B I. B. P.—240° F | 0.8 | 1.7 | 9.7 | 87.8 | 67 |
| 5B 240° F.—E. P | 2.0 | 15.7 | 75.0 | 7.3 | 33 |

Fuel 41 in Table I is a motor fuel obtained from a commercial cracking unit in which the petroleum oil charging stock is cracked in the vapor phase at high temperature. Reference to Table II shows that this fuel contains 80% of unsaturated hydrocarbons.

Fuel 44 is a blended fuel containing 1 part by volume of the low boiling fraction of fuel 41, that is, the fraction boiling between approximately 93° and 240° F., and 1 part by volume of a fraction boiling between approximately 240° F. and 400° F. and consisting of 40% of a highly refined naphtha from Mirando crude which contains 98% naphthenic hydrocarbons and 60% of a high octane paraffinic hydrocarbon fraction. From the data in Tables I and II, it will be seen that fuel 44 has the same unsaturated low boiling fraction as fuel 41, while the high boiling fraction is substantially saturated, the unsaturate content being only 7%.

Fuel 45 is a blended fuel containing 1 part by volume of the high boiling fraction of fuel 41, that is, the material boiling between approximately 240° F. and 408° F. and 1 part by volume of material consisting of 70% of straight run paraffinic hydrocarbons boiling below 240° F. and 30% of substantially pure iso-octane (boiling point 211° F.). Fuel 45 has the same unsaturated high boiling fraction as fuel 41, while the low boiling fraction is substantially saturated.

Figure 1 shows the unusual road rating test results obtained with fuel 44 in which there is a substantial proportion of unsaturated constituents in the low boiling range, and which contains a substantial proportion of saturated constituents in the high boiling range in comparison with other types of fuels of the same octane rating, as fuels 41 and 45. Curve 1 shows the standard spark advance setting for the particular car used in these tests. This car is a well-known and widely distributed standard make of car. Curve 41 shows the results obtained when using fuel 41 consisting entirely of high temperature vapor phase cracked gasoline. It will be noted that curve 41 lies a substantial distance above curve 1 in the low speed range, thus indicating that no difficulty due to knocking was encountered when using this fuel at low speeds. However, in speeds somewhat above 50 miles per hour, curve 41 is below curve 1, indicating that at these speeds under conditions of rapid acceleration, knocking with this fuel was encountered. It will thus be seen that although the low speed performance characteristics of this fuel are good, the high speed performance characteristics are such that poor high speed performance was encountered. Curve 45 shows the results obtained with fuel 45 in which the high boiling end of the fuel consists substantially of the same unsaturated hydrocarbons as are present in the high boiling fraction of fuel 44, the low boiling portion of the fuel consisting predominantly of saturated hydrocarbons, the analysis in Table II showing only 8.3% of unsaturates in the low boiling portion of the fuel. In the low speed ranges curve 45 is appreciably below curve 41 and nearer to curve 1, indicating that the low speed performance of fuel 45 is not nearly so good as the low speed performance of fuel 41, which contains unsaturated constituents in the low boiling range. The high speed performance of fuel 45 is improved, presumably due to a carry-over effect of the saturated hydrocarbons in the low boiling portion of this fuel, this effect being made possible by the high rate of fuel feed which prevails during high speed operation. Curve 44 shows the performance characteristics of fuel 44 which is a motor fuel in which the low boiling portion is predominantly unsaturated and the high boiling portion is predominantly saturated, the exact figures on unsaturates being 70.2% in the low boiling fraction and 7.0% in the high boiling fraction, as shown in Table II. It is seen that the low speed performance of fuel 44 is better than that of fuel 41 or 45, and further, the high speed performance is greatly superior to that of fuel 41 in which the high boiling fraction consisted predominantly of unsaturated hydrocarbons. It is thus seen that superior all-speed performance is accomplished only when the motor fuel consists of predominantly unsaturated hydrocarbons in the low boiling fraction and saturated hydrocarbons in the high boiling fraction, and that this all speed performance is superior to the performance which could have been predicted by the results obtained from fuels 41 and 45.

Figure 2:
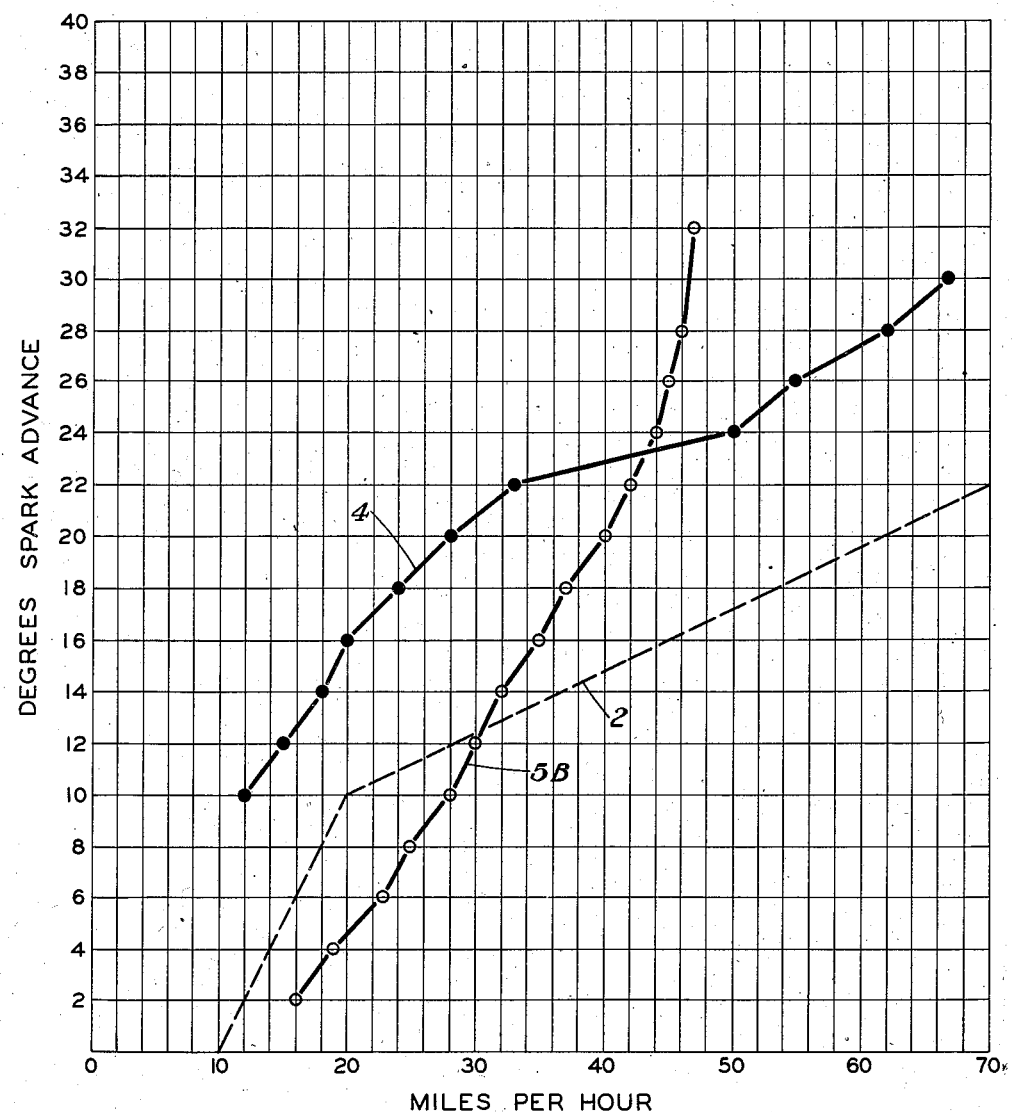

The superior performance and lead susceptibility of motor fuels in which the low boiling components are predominantly unsaturated and the high boiling components predominantly saturated is clearly brought out in Figure 2. In Figure 2, curve 2 shows the standard spark advance setting for the car used in the tests. This car was a modification of a well-known and widely-distributed standard make of car which utilizes a valve-in-head engine. The modification consisted of having the engine built to a compression ratio of 8 to 1. Fuels 4 and 5B were used in this work. These fuels were blended fuels, the hydrocarbon base stock in each case consisting of the following materials in the following proportions: Fuel 4—33%, 275 E. P. vapor phase cracked distillate, 22% high octane, high boiling naphtha obtained from Mirando crude (220 I. B. P.—392 E. P.), 27% iso-octane and 18% of mixed olefins, principally amylenes; Fuel 5B—40.6% of low boiling paraffinic hydrocarbons, 17.5 n-butane, 30.8% high octane, high boiling naphtha obtained from Mirando crude and 11.1% of iso-octane. The same Mirando naphtha was used for both fuels 4 and 5B.

Curve 4 shows the results obtained when using fuel 4 which is an 80 octane base motor fuel to which is added 1.8 cc. of tetraethyl lead per gallon to bring the octane to 85 and in which the low boiling portion consisted predominantly of unsaturated hydrocarbons and the high boiling portion consisted predominantly of saturated hydrocarbons. It is seen that this curve lies well above curve 2 which is the standard spark advance setting for the car, thus indicating that at all speeds there was no difficulty with knocking in this car when using fuel 4. Fuel 5B is an 80.3 octane base motor fuel to which 3.0 cc. of tetraethyl lead per gallon has been added to bring the octane number to 91.4. In this fuel the low boiling portion and the high boiling portion are substantially saturated. The results obtained with fuel 5B show that unsatisfactory performance due to knocking was encountered under conditions of acceleration at all speeds up to a speed slightly over 30 miles per hour, in spite of the fact that fuel 5B has an A. S. T. M. octane number of 91.4 as compared with only 85 for fuel 4. At speeds above approximately 43 miles per hour the performance of fuel 5B is superior to fuel 4; however, the high speed portion of the curves for both fuels 4 and 5B are so far above the curve of the standard spark advance setting as to insure excellent performance at high speeds and to make this feature of minor importance.

The particular proportion of unsaturated components which it is desired to have present in the low boiling fraction of the fuel and the proportion of saturated components present in the high boiling fraction of the fuel may be varied between rather wide limits as long as the unsaturated components preponderate in the low boiling fraction and the saturated components preponderate in the high boiling fraction. Particularly effective results have been obtained when the low boiling fraction contains a minimum of approximately 70% unsaturates and the high boiling fraction contains a minimum of approximately 85% saturated compounds. The high boiling saturated fraction is preferably of relatively high octane, that is, not less than about 45 octane number. Increased percentages of the components indicated in each case usually produce further improvements in the motor fuel. In general, it is neither economical nor necessary to have the low boiling fraction completely unsaturated or the high boiling fraction completely saturated.

By thus controlling the chemical composition-boiling range characteristics of motor fuels, it is possible to obtain greatly improved engine performance from motor fuels whose over-all octane number, as indicated by the usual octane determination, remains the same. It is possible to effect these unusual results either by adding hydrocarbon compounds of the desired character and boiling range to motor fuels, or by appropriate fractionation and thermal treatment of petroleum hydrocarbons and then utilizing the hydrocarbon mixture thus produced. For a given octane rating, whether it be high or low, motor fuels the composition of which has been controlled in accordance with this invention, produce vastly superior performance in the spark ignition type of internal combustion engines. However, it is generally preferred to have a minimum of approximately 65 octane in the finished fuel for most effective results in the internal combustion engines now commercially prevalent.

Although the invention has been described in connection with specific details of certain embodiments thereof, it is not intended that such details shall be considered as limiting the scope of the invention except insofar as indicated in the following claims.

I claim:

1. A hydrocarbon motor fuel approximating gasoline in boiling range containing not less than 25% of hydrocarbons boiling below 240° F. not less than 70% of which consists of olefins, and not less than 25% of hydrocarbons boiling above 240° F. not less than 93% of which consists of saturated hydrocarbons.

2. A hydrocarbon motor fuel approximating gasoline in boiling range containing not less than 25% of hydrocarbons boiling below 240° F. not less than about 52% of which consists of olefins, and not less than 25% of hydrocarbons boiling above 240° F. not less than 85% of which consists of saturated hydrocarbons.

3. A hydrocarbon motor fuel having an A. S. T. M. octane number of at least 65 comprising a major portion of a fraction boiling up to approximately 240° F., consisting of a mixture of hydrocarbons within the gasoline boiling range and of which at least approximately 70% are olefins and a substantial portion of a fraction boiling above approximately 240° F., but within gasoline boiling range and containing not less than approximately 85% of saturated hydrocarbons and having an A. S. T. M. octane number of at least 45.

4. A hydrocarbon motor fuel approximating gasoline in boiling range comprising approximately equal portions boiling up to 240° F. and above 240° F., the portion boiling up to 240° F. having an olefin content of not less than 70% and the portion boiling above 240° F. having a saturate content of not less than 93%.

5. A hydrocarbon motor fuel approximating gasoline in boiling range comprising approximately equal portions boiling up to 240° F. and above 240° F., the portion boiling up to 240° F. having an olefin content of not less than 52% and the portion boiling above 240° F. having a saturate content of not less than 85%.

THOMAS H. RISK.